(31.)
LEWIS C. SIMS.
Improvement in Coupling for Vehicles.
No. 121,675. Patented Dec. 5, 1871.
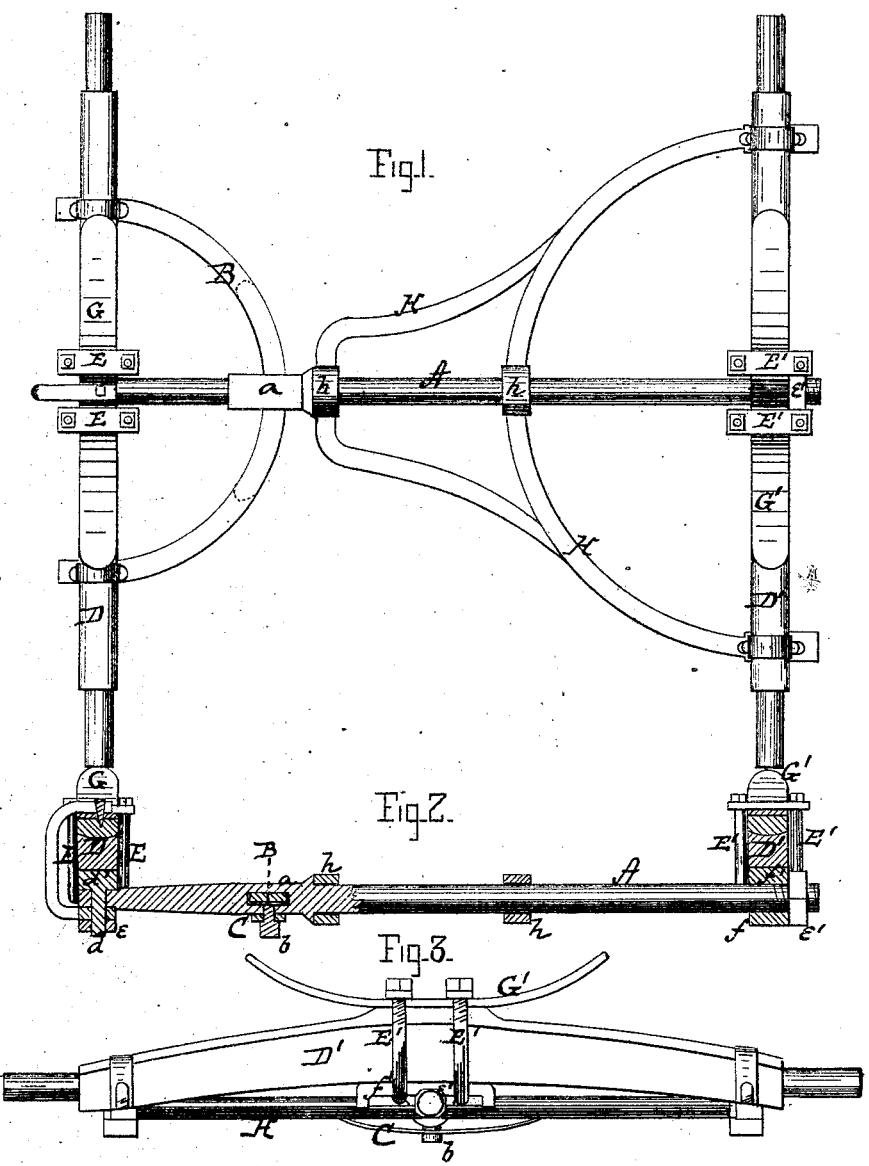

121,675

UNITED STATES PATENT OFFICE.

LEWIS C. SIMS, OF MARTINSBURG, OHIO.

IMPROVEMENT IN COUPLINGS FOR VEHICLES.

Specification forming part of Letters Patent No. 121,675, dated December 5, 1871.

*To all whom it may concern:*

Be it known that I, LEWIS C. SIMS, of Martinsburg, in the county of Knox and in the State of Ohio, have invented certain new and useful Improvements in Coupling for Vehicles; and do hereby declare that the following is a full, clear, and exact description thereof, reference being had to the accompanying drawing and to the letters of reference marked thereon making a part of this specification.

The nature of my invention consists in the construction and arrangement of a coupling for vehicles, as will be hereinafter more fully set forth.

In order to enable others skilled in the art to which my invention appertains to make and use the same, I will now proceed to describe its construction and operation, referring to the annexed drawing, in which—

Figure 1 is a plan view; Fig. 2, a longitudinal vertical section; and Fig. 3 is a rear elevation of my coupling. Fig. 4 is a view of the box under the hind axle, and Fig. 5 is a front view of the center of the front axle.

A represents the reach, which is made round except at the point $a$, where the front circle B goes through it, said part being made square, with a set-pin or screw, $b$, passing into it from the under side to secure the spring C to the reach. The ends of this spring bear against the under side of the circle, and press the same against the upper side of the mortise in the square part $a$, through which the circle passes, thus producing the necessary tension or friction on the circle. The front end of the reach A is placed on the coupling-pin $d$ under the front axle D, and secured by a nut, $e$, on the end of said pin; and the rear end of the reach passes through a box, $f$, on the under side of the hind axle D′, and is secured by a nut, $e'$, on the extreme end of the reach. The coupling-pin $d$ extends downward from a bar, $d'$, which is laid against the under side of the front axle D, and secured by the clips E E, which fasten the front carriage-spring G to the axle. In like manner the box $f$ is formed on the under side of a bar, $f$, fastened to the under side of the hind axle D′ by the clips E′, which secure the hind carriage-spring G′ to the axle. H H are the braces attached to the hind axle, said braces having swivels $h\,h$ formed in them, through which the reach passes.

Having thus fully described my invention, what I claim as new, and desire to secure by Letters Patent, is—

1. The reach A, made round, with a square part, $a$, mortised for the circle B to pass through, in combination with said circle, the spring C, and set-pin or screw $b$, all substantially as and for the purposes herein set forth.

2. The coupling-pin $d$ and bar $d'$, attached to the front axle by the clips E, substantially as herein set forth.

3. The box $f$ and bar $f'$ attached to the hind axle by the clips E′, substantially as herein set forth.

4. The combination of the reach A, circle B, spring C, axles D D′, pin $d$, box $f$, and braces H H with swivels $h\,h$, all constructed and arranged substantially as and for the purposes herein set forth.

In testimony that I claim the foregoing I have hereunto set my hand this 23d day of October, 1871.

LEWIS C. SIMS.

Witnesses:
I. M. KIRKPATRICK,
G. B. THRADKILL.

(31)